US012135823B2

(12) United States Patent
Deva et al.

(10) Patent No.: US 12,135,823 B2
(45) Date of Patent: Nov. 5, 2024

(54) USER INTERFACE-BASED RESTRICTION ON CONTENT ACCESS

(71) Applicant: Apple Inc., Cupertino, CA (US)

(72) Inventors: Betim Deva, Palo Alto, CA (US); Mufaddal Y. Khumri, San Jose, CA (US); Ying Chen, San Jose, CA (US); Jason P. Ketterman, San Jose, CA (US); Zhiyuan Zhao, Saratoga, CA (US); Edward T. Schmidt, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 17/589,891

(22) Filed: Jan. 31, 2022

(65) Prior Publication Data
US 2023/0080210 A1 Mar. 16, 2023

Related U.S. Application Data
(60) Provisional application No. 63/243,694, filed on Sep. 13, 2021.

(51) Int. Cl.
*G06F 21/62* (2013.01)
*G06F 21/33* (2013.01)
(Continued)

(52) U.S. Cl.
CPC ............ *G06F 21/629* (2013.01); *G06F 21/33* (2013.01); *H04M 1/72442* (2021.01);
(Continued)

(58) Field of Classification Search
CPC .......... G06F 21/23; G06F 21/29; G06F 21/44; G06F 21/629; G06F 21/1014–1015; G06F 17/40
(Continued)

(56) References Cited

U.S. PATENT DOCUMENTS 7,023,979 B1 * 4/2006 Wu ..................... H04M 3/5233
379/265.11
7,827,300 B2 11/2010 Ingvarsson et al.
(Continued)

FOREIGN PATENT DOCUMENTS

JP 2021-523487 A 9/2021
WO WO 2013/001852 1/2013

OTHER PUBLICATIONS

European Office Action from European Patent Application No. 22191004.5, dated Feb. 10, 2023, 6 pages.
(Continued)

*Primary Examiner* — Samson B Lemma
(74) *Attorney, Agent, or Firm* — BAKERHOSTETLER

(57) ABSTRACT

The subject disclosure provides systems and methods for providing access to media content from a server based on a user interface of a client device through which the access is requested. A user may access certain media content, such as a song, album, playlist, a radio station, etc., only if a request for that content is initiated via a specific user interface, and when the user is a subscriber to a reduced subscription tier to a service of the server. To restrict the access in this way, an interface-specific token is generated at a server for each media content. The interface-specific token is received by a user device and is used for further access to the media content from the server.

20 Claims, 7 Drawing Sheets

(51) Int. Cl.
  *H04M 1/72442* (2021.01)
  *H04M 1/72454* (2021.01)
  *H04M 1/72463* (2021.01)
  *G06F 21/10* (2013.01)

(52) U.S. Cl.
  CPC ... *H04M 1/72454* (2021.01); *H04M 1/72463* (2021.01); *G06F 21/1014* (2023.08); *G06F 21/1015* (2023.08)

(58) Field of Classification Search
  USPC .......................................................... 726/4
  See application file for complete search history.

(56) References Cited

U.S. PATENT DOCUMENTS

| | | | | |
|---|---|---|---|---|
| 8,316,237 | B1* | 11/2012 | Felsher | H04L 9/3249 380/282 |
| 8,499,343 | B2 | 7/2013 | Lemus et al. | |
| 8,533,860 | B1* | 9/2013 | Grecia | H04L 63/083 713/185 |
| 8,589,580 | B2* | 11/2013 | Gutarin | H04L 67/52 725/56 |
| 9,112,849 | B1* | 8/2015 | Werkelin Ahlin | G06F 3/00 |
| 9,185,103 | B2 | 11/2015 | Lang et al. | |
| 9,231,935 | B1* | 1/2016 | Bridge | H04L 63/08 |
| 9,386,395 | B1* | 7/2016 | Delker | H04W 4/023 |
| 11,423,372 | B1* | 8/2022 | Martinson | G07G 1/12 |
| 2008/0229402 | A1* | 9/2008 | Smetters | H04L 63/0853 726/9 |
| 2011/0093397 | A1* | 4/2011 | Carlson | G06Q 20/382 705/67 |
| 2013/0104249 | A1* | 4/2013 | Cakulev | H04L 67/1063 726/30 |
| 2014/0215018 | A1* | 7/2014 | Lam | H04L 65/61 709/219 |
| 2015/0067871 | A1* | 3/2015 | Commons | G06F 16/4387 707/758 |
| 2015/0142673 | A1* | 5/2015 | Nelsen | G06Q 20/405 705/76 |
| 2015/0382079 | A1* | 12/2015 | Lister | H04N 5/783 725/38 |
| 2016/0191590 | A1* | 6/2016 | Werkelin Ahlin | H04N 21/43615 |
| 2017/0358302 | A1* | 12/2017 | Orr | G06F 16/435 |
| 2018/0150832 | A1* | 5/2018 | Badal-Badalian | G06Q 20/3276 |
| 2018/0213059 | A1* | 7/2018 | Alsina | H04L 67/55 |
| 2018/0231059 | A1 | 8/2018 | Alsina et al. | |
| 2019/0325434 | A1* | 10/2019 | Nandakumar | G06Q 20/3274 |
| 2020/0304299 | A1* | 9/2020 | Medvinsky | H04L 9/0844 |
| 2022/0078513 | A1* | 3/2022 | Thoresz | H04N 21/43615 |

OTHER PUBLICATIONS

European Search Report from European Patent Application No. 22191004.5, dated Jan. 30, 2023, 4 pages.

Japanese Office Action from Japanese Patent Application No. 2022-135121, dated Oct. 6, 2023, 6 pages including English language translation.

Japanese Office Action from Japanese Patent Application No. 2022-135121, dated Mar. 22, 2024, 4 pages including English language translation.

* cited by examiner

USER INTERFACE-BASED RESTRICTION ON CONTENT ACCESS

CROSS REFERENCE TO RELATED APPLICATIONS

This application claims the benefit of priority to U.S. Provisional Patent Application No. 63/243,694, entitled "User Interface-Based Restriction On Content Access," filed on Sep. 13, 2021, the disclosure of which is hereby incorporated herein in its entirety.

TECHNICAL FIELD

The present description relates generally to user-interface based restriction on access to media content and services for electronic devices.

BACKGROUND

Users of electronic devices often access media content (e.g., a song or an album) provided by a service via an application on the electronic device. The application provides a user interface through which requests can be sent to the service or a server. A user typically needs to subscribe to the service to get access to certain media content via the user's electronic device, using the user interface.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
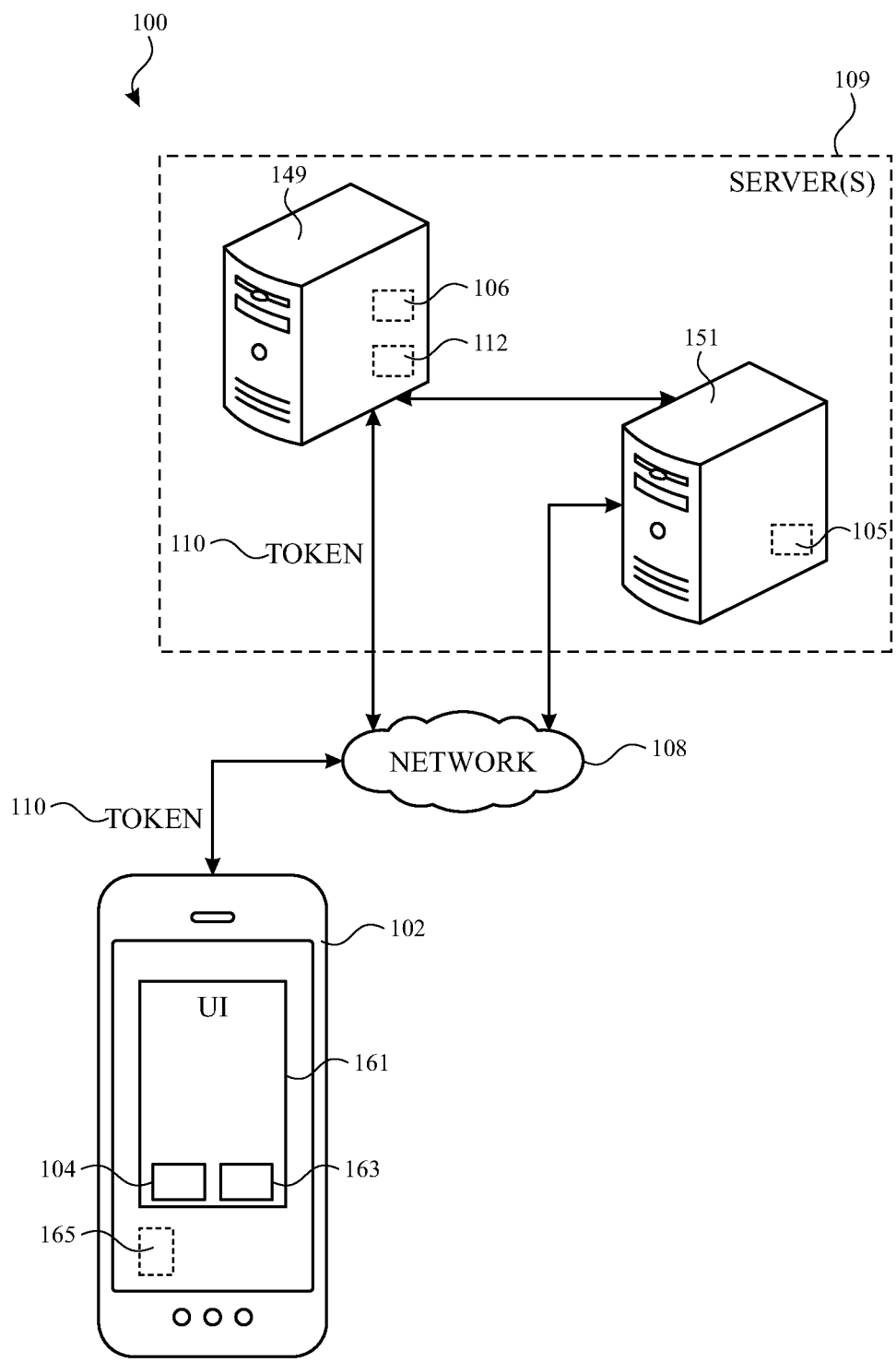
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides for controlled access to media content based on an interface through which that media content is requested.

In aspects, a user of an electronic device (e.g., a smartphone, a laptop computer, or a wearable device) can request media content from a content server providing a service, such as, for example, a streaming audio and/or music content service. The service may have one or more subscription tiers—for example, at least a full (regular) subscription tier and a reduced subscription tier. It should be appreciated that the service may have more than two subscription tiers which may be associated with different prices, access to different content, and/or which can vary in other ways in which a service is provided to users. For purposes of aspects of the present disclosure, a user is taken as a subscriber of a reduced subscription tier, such that the user has not subscribed for the full user experience provided by the service, regardless of a type and number of subscription tiers.

In various implementations, if a user is a subscriber of a reduced subscription tier of a service provided by a content server, a method is provided that permits the user to access media content only through a reduced set of user interfaces. The set of user interfaces that can be used to access media content for the reduced subscription tier may include, for example, a voice user interface (which can receive a voice-initiated request for a media content) or a recommended-content interface (which can receive a request for a media content that has been recommended to the user. In some implementations, the voice user interface (which may be a voice/graphical user interface) and the recommended-content interface may be parts of the same overall user interface of, for example, an application.

In order to enforce which user interface can be used to access the media content, an interface-specific token associated with the media content may be obtained from a media server (or service), for example, from a media application programming interface (API) service associated with a media content server. In some examples, the media API service generates the interface-specific token when media content is requested from the user's electronic device from via approved interface at the electronic device. The generated interface-specific token may be specific to requested media content, such that each media content item (e.g., a song, album, playlist, or station) has an interface-specific token generated for that media content item.

In some implementations, another request for media content may be provided, along with the interface-specific token, to a content server. Responsively, the content server may verify the interface-specific token and return the requested media content to the user's electronic device upon successful verification. Prior to issuing an interface-specific token, a server may verify whether the user's electronic device is authenticated to access the content from the server using a particular interface, and whether the user (or the user's electronic device) has a subscription to a service provided by the content server, which is a reduced subscription tier. An interface-specific token may be required to access media content by a user that has subscribed to a reduced subscription tier. In this way, a user is prevented from accessing a media content directly from the server via any interface in use cases when interface-specific tokens are not used for media content.

In some implementations, the interface-specific token may be a renewable token, to provide continuity of service.

FIG. 1 illustrates an example network environment 100 that includes various devices in accordance with one or more implementations of the present disclosure. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102 having a user interface 161, and one or more servers such as servers 109, communicatively coupled by a network 108 (e.g., a wide area or local network). However, the present disclosure can be implemented using to a wide variety of network configurations that allow intercommunication of the electronic device 102 and one or more servers and/or services. For explanatory purposes, the network environment 100 is illustrated in FIG. 1 as including the electronic device 102 and servers 109; however, it should be appreciated that the network environment 100 may include any number of electronic and/or audio devices and any number of servers or a data center including multiple servers.

In the example, of FIG. 1, the servers 109 include a server 149 (e.g., a content server) and a server 151 (e.g., a virtual assistant server). In this example, the server 149 may include a content service 106 and media API service 112. In this example, the server 151 may be a virtual assistant server and may include a virtual assistant service 105.

The electronic device 102 is a client device that may be, for example, a smartphone, a portable computing device such as a laptop computer, a tablet device, a wearable device such as a smart watch, a smart band, and the like. It should be appreciated that the electronic device 102 is shown as a mobile smartphone device in FIG. 1 for illustration purposes only, as the electronic device 102 can be any other appropriate device that includes, for example, processing circuitry and communications circuitry for communicating with the servers 109, including the content service 106, the media API service 112, and/or the virtual assistant service 105, and/or with any other services and servers, or devices. In one or more implementations, the electronic device 102 may present a user interface 161 through which music content can be requested, to be output (played back) by the electronic device 102. The user interface 161 may be presented by an application (e.g., a streaming music service application) that communicates with services, such as, for example, a subscription-based music streaming service (provided by the content service 106) to which the user of the electronic device 102 is subscribed. Thus, the electronic device 102 can be associated with a user account (e.g., at the content service 106 and/or another server that is coupled to the content server) that is subscribed to one or more services provided by the content service 106

The content service 106, which may be provided by a media streaming server (e.g., server 149), stores and/or has access to various media content which can be provided to electronic devices, such as the electronic device 102, or any other suitable device that can perform a playback of a media content, and that has proper authorization and a type of subscription to one or more services provided by the content service 106. In an implementation, the content service 106 may function as a cloud storage server.

The media API service 112 is a suitable API service component that, in one or more implementations, generates an interface-specific token 110 associated with respective media content, such as a song, an album, a playlist, a station (e.g., a radio station or another broadcast media channel, which can be a user-created radio station). In some implementations, the media API service 112 also performs one or more of verifying an interface-specific token, authenticating the user (or user's request information, user's account, and/or user's device), and checking the existence and type of a subscription to services for the account associated with a requesting electronic device.

In some implementations, as shown schematically in FIG. 1, the media API service 112 and the content service 106 may be provided by the same server (e.g., server 149). In the implementations, the servers 109 may include separate servers that provide a content service 106 and a media API service 112. In one or more implementations, the virtual assistant service 105 may be provided by separate server 151, or by the same server 149. In one or more implementations, communications between the server 149 and the server 151 may be exchanged for verification and/or validation of a user account and/or token for accessing media content. In some implementations, the media API service 112 is an API associated with the content service 106, and the media API service 112 allows access to functionality and data (e.g., various media content) stored by or accessible by the content service 106. The media API service 112 may be configured to perform various functions related to operations of the server 149 (and/or other servers of the servers 109) such as, for example, generation of an interface-specific token, authentication of a user device (e.g., the electronic device 102), determining whether the device has a required type of a subscription provided by a service (e.g., a reduced subscription tier), as well as any other suitable functions.

The server 149 and/or the server 151 may form all or part of network of computers or a group of servers (not shown), such as in a cloud computing or data center implementation. For example, in some implementations, the server 149 stores data (e.g., media content) and software, and includes hardware (e.g., processors, communication circuitry, etc.) for generating and rendering content such as audio and video. In an implementation, the server 149 may function as a cloud storage server.

In some implementations, the user interface 161 can be a graphical user interface of an application such as a music player application. As shown, the electronic device 102 may also provide other interfaces for user interaction, such as a virtual assistant application 165 (e.g., an artificial intelligent (AI)-driven virtual assistant) that may function as a voice user interface of the electronic device 102. As shown, the user interface 161 may include various user interface elements, such as a user interface element 104, and user interface element 163. For example, the user interface element 104 may be a recommended-content interface that displays or otherwise provides to the user recommendations or similar items related to media content. For example, in an implementation, the recommended-content interface may be provided upon selection of a menu bar item or a tab menu that provides personalized recommendations of songs, albums, playlists, stations, or combinations thereof for the account of the user of the electronic device 102. The personalized recommendations may be recommendations generated at the electronic device 102 and/or at the servers 109 based on prior activity associated with the account of the user (e.g., prior selections of media content, likes, dislikes, etc.). In one or more implementations, requests to play content that is recommended in the user interface element 104 may be allowed via the generation of an interface-specific token as described in further detail hereinafter. In one or more implementations, requests to play content that are received via the virtual assistant application 165 may be allowed via the generation of an interface-specific token as described in further detail hereinafter. In one or more implementations, requests to play content that is recommended in the user interface element 163 may be disallowed if the account associated with the electronic device 102 is subscribed to a reduced subscription tier. For example, the user interface element 163 may be a user interface element for browsing songs and/or other content that is available from the content service 106, or a user interface element for searching the songs and/or other content that is available from the content service 106.

Although the user interface 161, the user interface elements 104 and 163, and the virtual assistant application 165 are described in connection with FIG. 1, it is appreciated that various other user interface elements and/or components may be provided by the electronic device 102, as implementations of the present disclosure are not limited in this respect.

Figure 2:
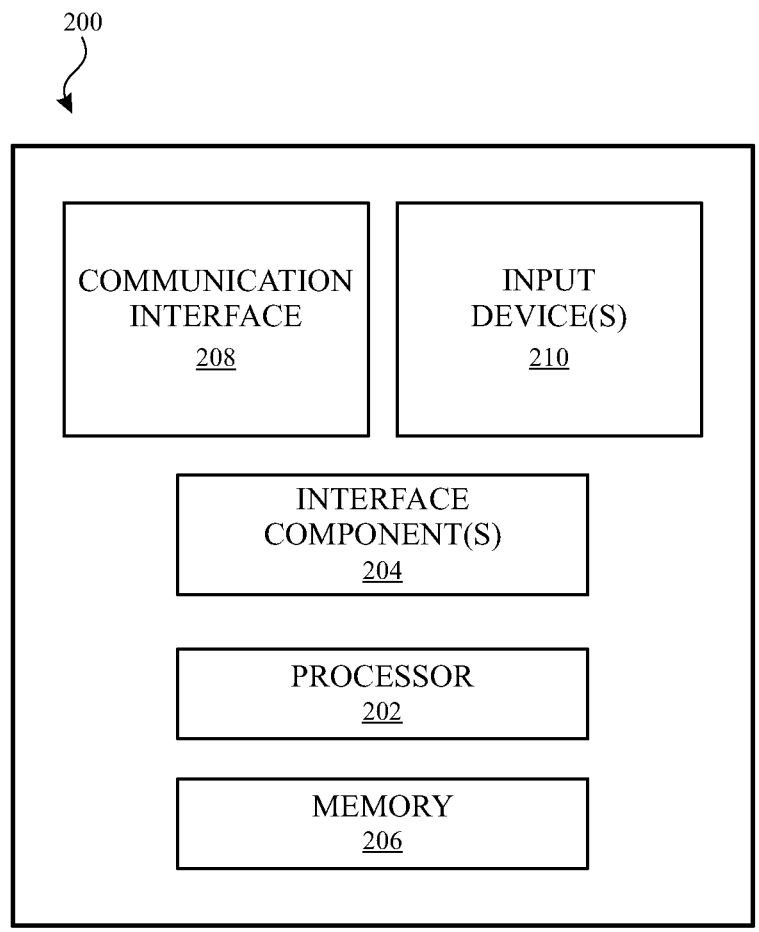
FIG. 2 illustrates an example electronic device that may implement a method in accordance with one or more implementations.

FIG. 2 illustrates an example electronic device that may implement a method in accordance with one or more implementations. For example, the device 200 of FIG. 2 can correspond to the electronic device 102 and/or the content service 106 of FIG. 1. However, not all of the depicted components may be used in all implementations, and one or more implementations may include additional or different components than those shown in FIG. 2. Variations in the arrangement and type of the components may be made without departing from the spirit or scope of the claims as set forth herein. Additional components, different components, or fewer components may be provided.

As shown in FIG. 2, the electronic device 200 may include a processor 202, a memory 206, interface components 204, a communication interface 208 and one or more input devices 210. The processor 202 may include suitable logic, circuitry, and/or code that enable processing data and/or controlling operations of the electronic device 200. In this regard, the processor 202 may be enabled to provide control signals to various other components of the electronic device 200. The processor 202 may also control transfers of data between various portions of the electronic device 200. Additionally, the processor 202 may enable implementation of an operating system or may otherwise execute code to manage operations of the electronic device 200. To perform any of the functionality described herein, the processor 202 may execute one or more computer executable instructions stored in one or more computer-readable storage media (e.g., the memory 206).

The memory 206 may include suitable logic, circuitry, and/or code that enable storage of various types of information such as received data, generated data, code, and/or configuration information. The memory 206 may include, for example, random access memory (RAM), read-only memory (ROM), flash, and/or magnetic storage.

In one or more implementations, in a case where the electronic device 200 corresponds to the electronic device 102 (FIG. 1), the memory 206 may store authentication information associated with one or more user accounts for one or more applications and/or services, using data stored locally in memory 206. Moreover, the input device(s) 210 may include suitable logic, circuitry, and/or code for capturing input, such as audio input (e.g., voice requests which are received via a microphone), remote control input, touch-screen input, keyboard input, etc.

As shown in FIG. 2, the electronic device 200 includes interface components 204 that enable a user of the electronic device 200 to interact with the electronic device 200 to perform various actions. For example, in one or more implementations, the interface components 204 may include a microphone that receives audio input (e.g., voice input) from a user of the electronic device 200, and/or a display such as a touch-sensitive display that displays icons and any other information associated with one or more applications, and/or receives touch inputs by which the user can interact with the icons and/or associated application via the user interface 161 of FIG. 1.

The communication interface 208 allows the electronic device 200 to communicate with various other devices, services, and servers. The communication interface 208 may include suitable logic, circuitry, and/or code that enables wired or wireless communication, such as between the electronic device 102 and the virtual assistant service 105, the media API service 112 and/or the content service 106 (which may be part of the same server/service) over the network 108. In some implementations, the communication interface 208 is a wireless communication interface. In some implementations, the communication interface 208 may include, for example, one or more of a cellular interface, a Bluetooth communication interface, an NFC interface, a Zigbee communication interface, a WLAN communication interface, a USB communication interface, or generally any suitable communication interface.

In one or more implementations, one or more of the processor 202, the memory 206, the interface components 204, the communication interface 208, the input device(s) 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3A:
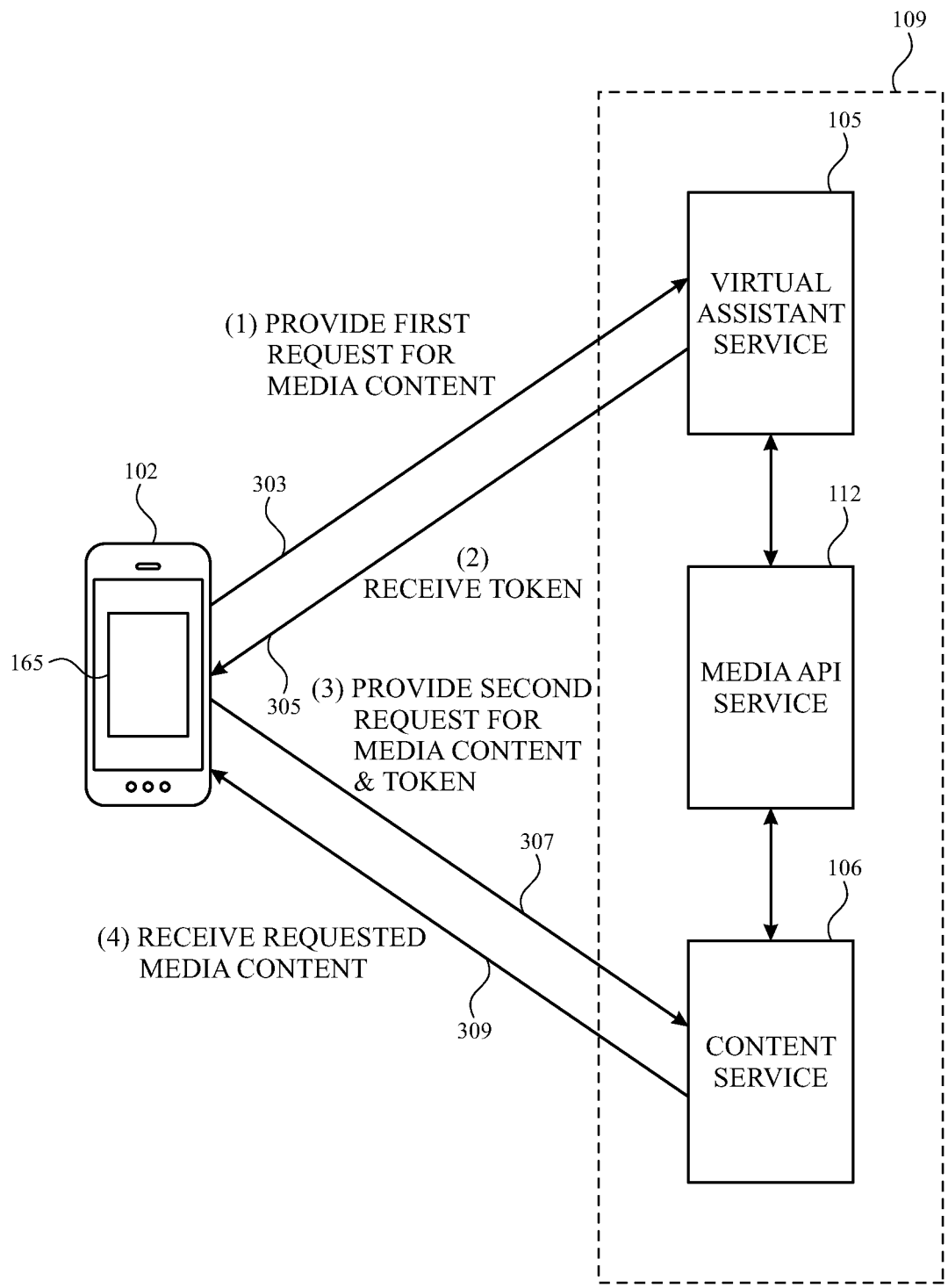
FIG. 3A illustrates an electronic device and servers which may implement a method in accordance with one or more implementations.
Figure 3B:
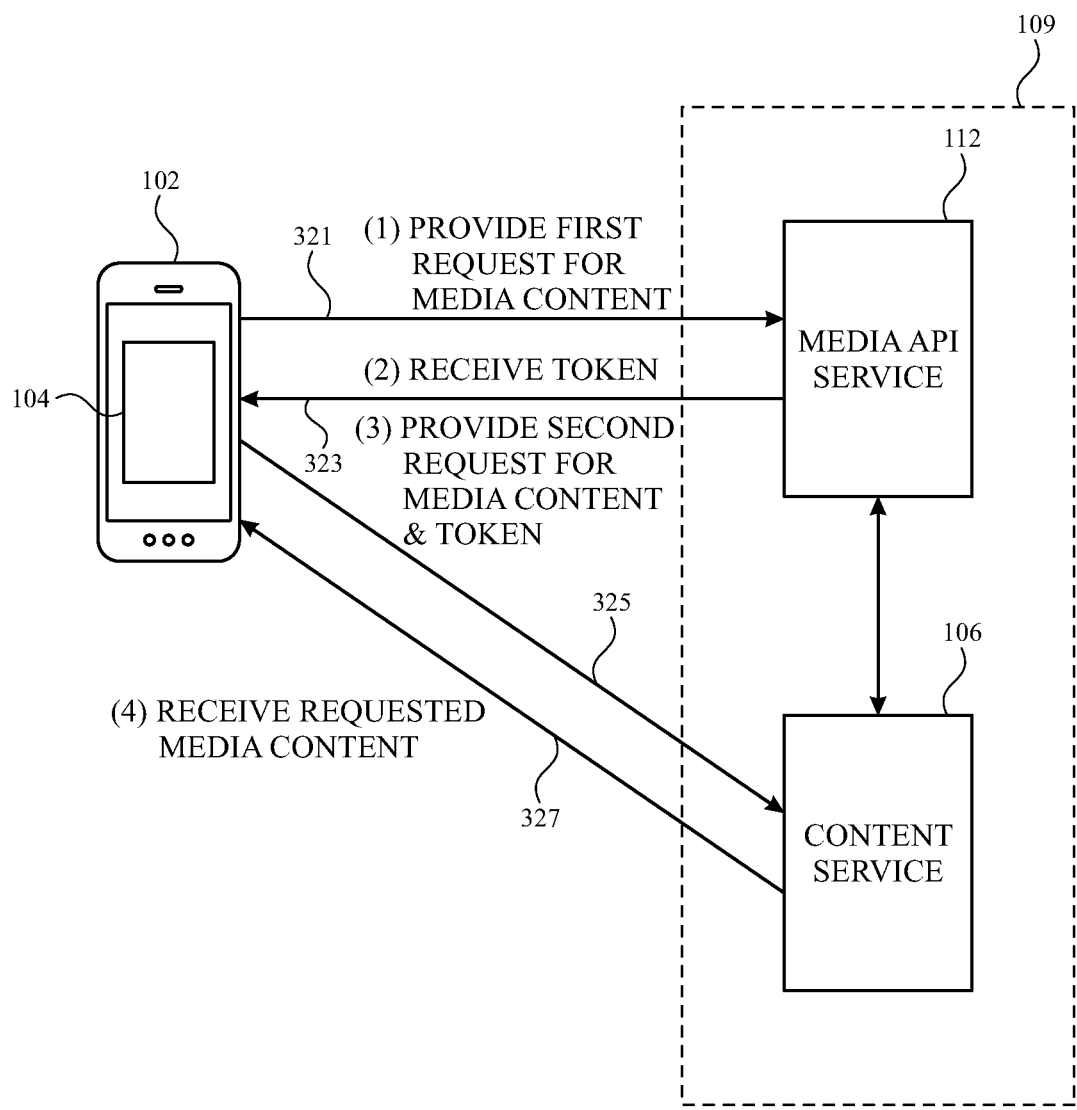
FIG. 3B illustrates an electronic device and servers which may implement a method in accordance with one or more implementations.
Figure 4:
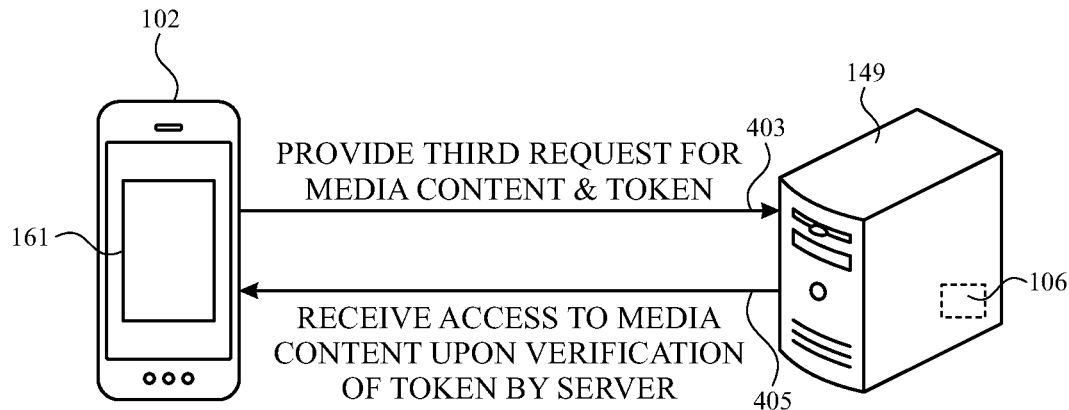
FIG. 4 further illustrates an electronic device and servers which may implement a method in accordance with one or more implementations.

FIGS. 3A, 3B, and 4 illustrate example use cases in which an electronic device and one or more servers communication as part of implementing a method in accordance with one or more implementations of the present disclosure. In the example of FIG. 3A, a user of electronic device 102 makes a voice request to play media content using the virtual assistant application 165. In the example of FIG. 3B, a user of electronic device 102 selects recommended media content for playback using the user interface element 104. In these examples, the electronic device 102 (comprising the user interface element 104 and the virtual assistant application 165), and the virtual assistant service, the media API service 112 and the content service 106 are shown for illustration purposes; it should however be appreciated that other types and devices, services, and servers can be used additionally or alternatively.

In the example of FIG. 3A, a first request for a media content can be provided (e.g., as indicated by arrow 303) from the virtual assistant application 165 of the electronic device 102, to the virtual assistant service 105 (e.g., at the server 151 of the servers 109). In one or more implementations, the virtual assistant service 105 (e.g., at the server 151) may provide the request (e.g., along with an indication that the request was received via the virtual assistant application 165) to the media API service 112 (e.g., at the server 149). In one or more implementations, the request can be provided from the virtual assistant service to the content service 106 and the media API service 112 (which can be an API service for the content service 106) receives the first request on behalf of the content service 106. In response, the media API service 112 and/or the content service 106 may generate an interface-specific token for the requested media content, and provide the interface-specific token to the virtual assistant service 105. The electronic device 102 may then receive (e.g., as indicated by arrow 305) an interface-specific token 110 (also referred to as a "voice activation token," or "token" herein) associated with the media content.

As shown in FIG. 3A, once the interface-specific token is received from the virtual assistant service 105, electronic device 102 may provide (e.g., as indicated by arrow 307) a second request for the media content to the content service 106, along with the interface-specific token received from the virtual assistant service 105. It should be appreciated that, in some implementations, the second request is received by an API of the content service 106, which can be, e.g., the media API service 112. Responsive to receiving the second request, the content service 106 may authenticate the electronic device 102 (e.g., an account to which the electronic device is signed in or registered) and check the device's (e.g., account's) subscription to the service of the content service 106. If the electronic device 102 is authenticated, and it is determined that the device 102 has a reduced subscription tier to the services, the content service 106 verifies the interface-specific token 110 for the requested media content. If the verification is successful, the electronic device 102 receives (e.g., as indicated by arrow 309) the media content, such that the user of the electronic device 102 can listen to or otherwise output the media content (and/or view a video associated with the media content).

In the example of FIG. 3B, a first request for a media content can be provided (e.g., as indicated by arrow 321) from the user interface element 104 (e.g., the recommended-content interface) of the electronic device 102, to the media API service 112. The first request can be to the content service 106 and the media API service 112 (which can be an API service for the content service 106) may receive the first request on behalf of the content service 106. In response, the electronic device 102 may receive (e.g., as indicated by arrow 323) an interface-specific token 110 associated with the media content.

In the example of FIG. 3B, once the interface-specific token is received from the media API service 112, electronic device 102 may provide (e.g., as indicated by arrow 325) a second request for the media content to the content service 106, along with the interface-specific token received from the media API service. It should be appreciated that, in some implementations, the second request is received by an API of the content service 106, which can be, e.g., the media API service 112. Responsive to receiving the second request, the content service 106 may authenticate the electronic device 102 (e.g., an account to which the electronic device is signed in or registered) and check the device's (e.g., account's) subscription to the service of the content service 106. If the electronic device 102 is authenticated, and it is determined that the device 102 has a reduced subscription tier to the services, the content service 106 verifies the interface-specific token 110 for the requested media content. If the verification is successful, the electronic device 102 receives (e.g., as indicated by arrow 327) the media content, such that the user of the electronic device 102 can listen to or otherwise output the media content (and/or view a video associated with the media content).

In one or more implementations, the interface-specific token corresponds to the interface-specific token 110 shown FIG. 1, and may be generated when the first request is initiated only by one or more specific interfaces (e.g., user interface element 104 or the virtual assistant application 165), and only for a subscriber to a reduced subscription tier of a service (e.g., a music or other content service) provided by the content service 106. In this way, access to a reduced set of services from the content service 106 can by be provided using the interface-specific token. In some implementations, as mentioned above, the user interface element 104 is a recommended-content interface and the request for a media content is required to be initiated from that type of interface, for example, via user input received with respect to a tab, icon, or other interactive feature of the user interface element 104 (or another suitable interface). It should be noted that, in some implementations, a recommended-content interface can be part of another user interface 161; and the recommended-content interface can be or can comprise an interface that provides a tab, icon, menu, or another feature(s) with respect to which user input can be received regarding a request for a media content. In general, aspects of the present disclosure allow controlling which user interface(s) can be used to access a media content, when the user of the electronic device 102 (and/or the electronic device 102 of the user) is associated with a certain subscription to the service, such as, e.g., a reduced subscription tier.

In one or more implementations, the interface-specific token 110 may be "opaque" to the electronic device 102, in that the electronic device 102 does not and/or cannot open or otherwise access or interpret the content of the interface-specific token 110. In some implementations, the interface-specific token 110 includes a signature and/or can include a unique identifier associated with the media content. The interface-specific token 110 may also include a unique identifier associated with a user of the device. Thus, the interface-specific token generated for a certain user may be prevented from being used by another user for media content access.

In one or more implementations, the interface-specific token 110 a content identifier of the media content, a user identifier, and a timestamp.

FIG. 4 shows that, after the electronic device 102 receives the media content (e.g., as shown by the arrows 309 and/or 327 in FIGS. 3A and/or 3B), and when a user requests to perform a subsequent playback of the media content is received at the electronic device 102, the electronic device 102 may provide the interface-specific token 110 and a third request (e.g., as indicated by arrow 403) for access to the media content to the content service 106. Upon verification of the interface-specific token 110 by the content service 106, the electronic device 102 receives the access to the media content from the content service 106, as indicated by arrow 405 in FIG. 4.

Figure 5:
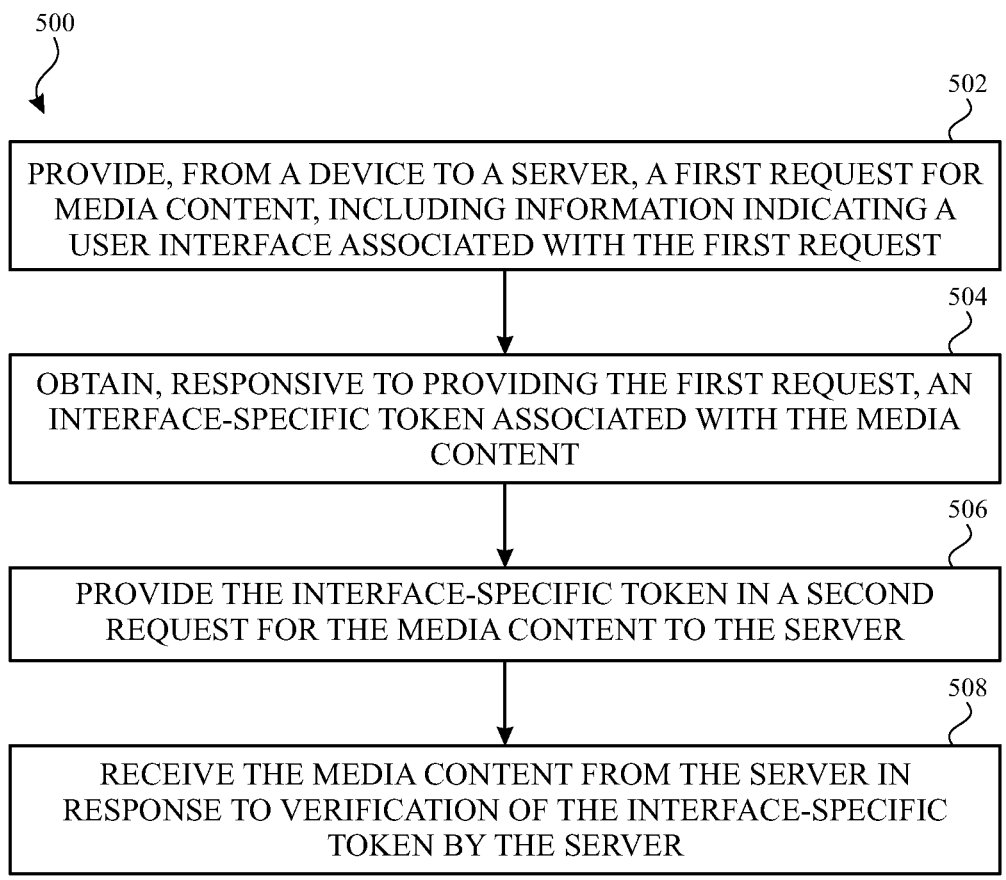
FIG. 5 is a flow chart of an example process for user interface-based access to media content, in accordance with one or more implementations.

FIG. 5 illustrates an example process 500 that can be performed by an electronic device (interchangeably referred to as a "device" in FIG. 5, as well as throughout the present disclosure), for interface-based access to media content, in accordance with one or more implementations. For explanatory purposes, the process 500 is primarily described herein with reference to the components of FIG. 1 (particularly with reference to electronic device 102 and servers 109), which may be executed by one or more processors of the electronic device 102 and/or servers 109 of FIG. 1. However, the process 500 is not limited to the electronic device 102, and one or more blocks (or operations) of the process 500 may be performed by one or more other components of other suitable devices, and/or one or more other servers. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 can be initiated when, in response to user input received via a user interface, the electronic device (e.g., electronic device 102) requests media content from a server (e.g., one or more of servers 109). As shown in FIG. 5, at block 502, the process 500 includes providing, from a device (e.g., electronic device 102) to a server (e.g., one or more of servers 109, such as the server 149), a first request for media content, the request including information indicating a user interface associated with the first request. In some implementations, the first request can be received via a user interface, such as the user interface element 104 or the virtual assistant application 165 of the electronic device 102 (FIG. 1). In one or more implementations, the user interface is a voice user interface (e.g., including the virtual assistant application 165) that is configured to receive a voice request for the media content from the user of the device. In one or more implementations, the user interface is a combination of a voice user interface and a graphical user interface. In one or more implementations, the user interface is a recommended-content interface. In one or more implementations, processing at block 502 may include providing the first request to the server responsive to receiving the voice request.

In one or more implementations, the interface-specific token is specific to the media content. In one or more implementations, the user interface is a voice user interface (e.g., including a microphone and/or a virtual assistant application that receives spoken input via the microphone) of the device. In one or more implementations, the device may receive a voice request for the media content from a user of the device at the voice user interface. The device may generate the first request based on the voice request (e.g., by recognizing one or more words in the voice request and generating a digital request including the recognized one or more words), and may provide the first request to the server (e.g., the server 149) responsive to receiving the voice request, by providing the first request to the server via a virtual assistant server (e.g., the server 151). In one or more implementations, the server may receive a request from the virtual assistant server and may generate one or more interface-specific tokens corresponding to the requested content and the voice user interface, for return to the electronic device via the virtual assistant server.

In one or more implementations, the user interface is a recommended-content interface, and providing the first request to the server comprises receiving a user input via recommended-content interface at the device. In one or more implementations, the first request includes authentication information (e.g., a password, an account token, or biometric authentication information) for a user account, for determination, by the server, whether the device is associated with a subscription. In one or more implementations, the interface-specific token is obtained if it is determined by the server that the device is associated with the subscription (e.g., a reduced subscription) and not associated with another subscription (e.g., a full subscription).

In one or more implementations, the interface-specific token includes a signature, and the signature includes a unique identifier associated with the media content and a unique identifier associated with a user of the device. In one or more implementations, the media content includes a song.

At block 504 of FIG. 5, the process 500 includes obtaining, responsive to providing the first request, an interface-specific token associated with the media content. In some implementations, the media content includes at least two pieces of the media content, and obtaining the interface-specific token associated with the media content comprises obtaining a respective interface-specific token for each of a predetermined number of the at least two pieces of the media content. For example, the media content can be an album including one or more songs, and an interface-specific token is generated for each song in the album and for the album itself. As another example, the media content can be a playlist including one or more songs, and an interface-specific token is generated for each song in the playlist and for the playlist. Similarly, an interface-specific token can be generated for a station and for each media content item in the station. An album, a playlist, and a station can be referred to in some implementations as containers which include media content.

At block 506, the interface-specific token is provided in a second request for the media content to the server (e.g., the same server or another server). The server may verify the interface-specific token that the server has received in the second request for the media content. In one or more implementations the process 500 may include, at block 508, receiving the media content from the server in response to verification of the interface-specific token by the server.

Figure 6:
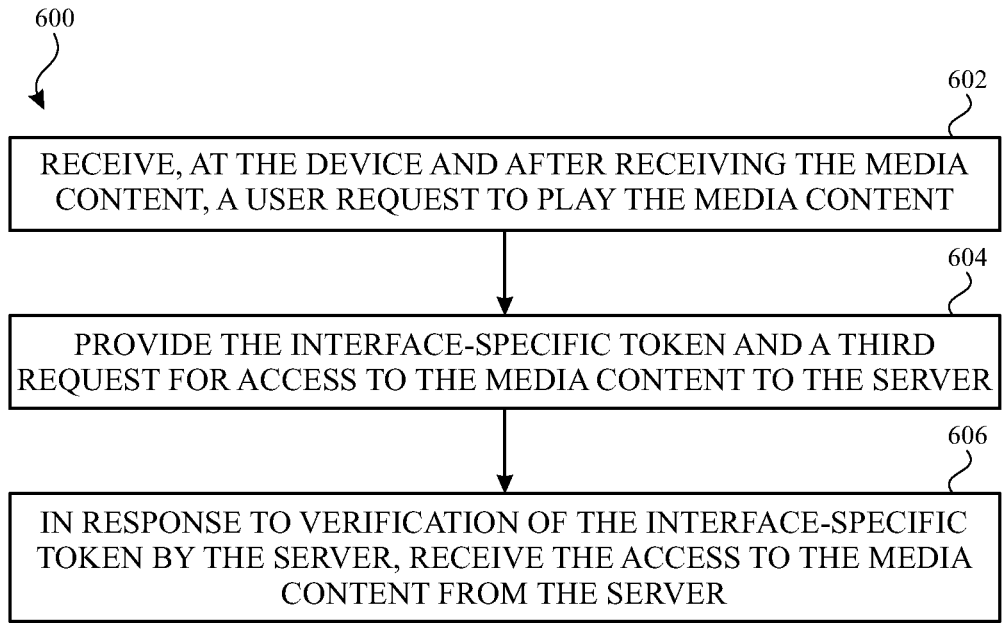
FIG. 6 is another flow chart of an example process for user interface-based access to media content, in accordance with one or more implementations.

FIG. 6 illustrates an example process 600 that can be performed by an electronic device (e.g., electronic device of FIG. 1) for replaying media content, in accordance with one or more implementations. The process 600 can be performed, for example, when the user requests playback of media content (e.g., a song, an album, a playlist, or a station) previously accessed using an interface-specific token. In some implementations, once the access to the media content is received using the process in accordance with implementations of the present disclosure (e.g., as shown in connection with the process 500 of FIG. 5, described above), the media content can be added (automatically or manually) to a playlist or a station. Playback of the media content can then be requested one or more times by the user from that playlist. At block 602, the process 600 includes receiving, at the device and after receiving the media content, a user request to play the media content. At block 604, the interface-specific token and a third request for access to the media content are provided to the server. In response to verification of the interface-specific token by the server, the electronic device receives the access to the media content from the server, at block 606 of FIG. 6.

As discussed above, in some implementations, an interface-specific token may be renewed (e.g., to provide continuity of a user experience). For example, if a user of the electronic device accesses a certain application (e.g., a music application or a media player application), information indicating the access may be communicated to one or more servers, such as servers 109) to cause any interface-specific tokens for media content played by the user (e.g., a playlist)

to be renewed. In other examples, if the music application is accessed by the user of the electronic device with certain frequency (e.g., once a week, as one example), interface-specific tokens for media content played by the user may be renewed on a regular basis.

Figure 7:
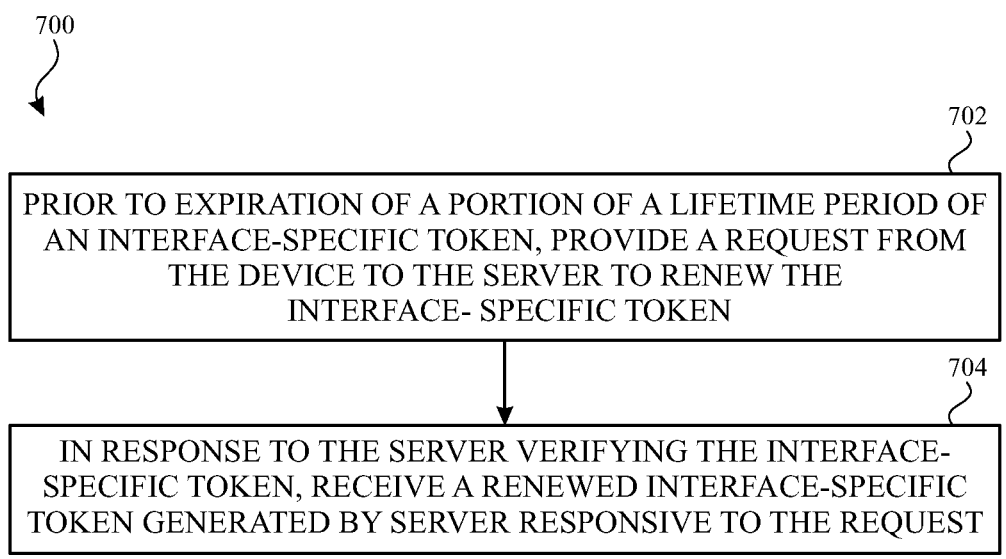
FIG. 7 is a flow chart of an example process for renewal of an interface-specific token, in accordance with one or more implementations.

FIG. 7 illustrates an example process 700 for renewal of an interface-specific token, in accordance with one or more implementations. In the example of FIG. 7, at block 702, the process 700 includes providing a request from the device (e.g., electronic device 102 of FIG. 1) to the server (e.g., one or more of servers 109 of FIG. 1) to renew an interface-specific token. In implementations, the renewal request is provided when a user launches a respective application on the user's device (e.g., the electronic device of FIG. 1), such as a smartphone or another device or when the user plays or otherwise accesses the media content associated with the token. The launching of the application and/or the media content may prompt the device to determine whether interface-specific tokens for any media content previously requested and/or played need to be renewed. In one or more implementations, an interface-specific token generated for a media content can be renewed multiple times.

At block 704 of the example of FIG. 7, in response to the server (in the example of FIG. 7, the media API service 112, which can be an API service for the content service 106) verifying the interface-specific token, the electronic device receives a renewed interface-specific token generated by server responsive to the request.

In the example process 700 of FIG. 7, the renewed interface-specific token is generated by the server based on a request from the device to the server to renew the interface-specific token. In some implementations, a renewed interface-specific token is generated without a request from the device for renewal of the interface-specific token. In such implementations, in response to the server verifying the interface-specific token, the device (e.g., electronic device 102 of FIG. 1) receives a renewed interface-specific token associated with the media content.

Figure 8:
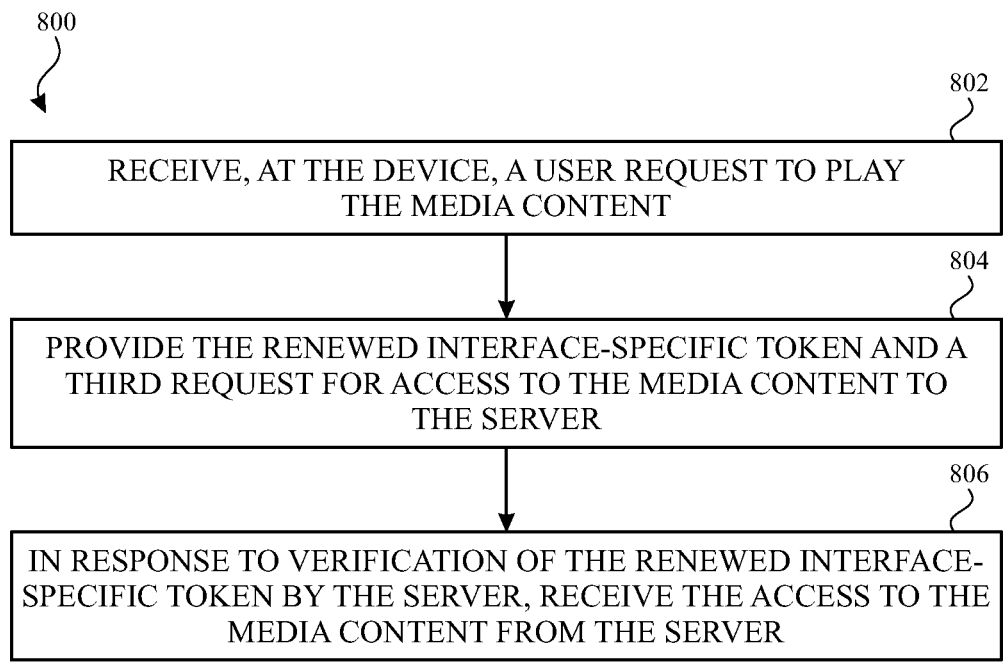
FIG. 8 is a flow chart of an example process 800 for playing media content, after an interface-specific token for the media content has been renewed, in accordance with one or more implementations.

Regardless of the specific way in which the interface-specific token is renewed, a renewed interface-specific token can be used for subsequent playback of a media content associated with the renewed interface-specific token. FIG. 8 illustrates an example process 800 for playing a media content following token renewal, in accordance with one or more implementations. The process 800 can be performed, for example, in use cases in which the device (e.g., electronic device 102 of FIG. 1) has obtained a renewed interface-specific token from the server (e.g., from content service 106 of FIG. 1 implemented at one or more of servers 109, such as server 149) as described above. In the example of FIG. 8, at block 802, the process 800 includes receiving, at the device, a user request to play the media content. The renewed interface-specific token and a third request for access to the media content may be provided to the server, at block 804, responsive to the request received at block 802. The request for access to the media content is referred to in this example as a "third" request to indicate that at least two prior requests for access to the media content were previously provided and an original, or initial interface-specific token was generated (see, e.g., process 500 in FIG. 5), prior to the generation of the renewed interface-specific token. At block 806 of FIG. 8, the process 800 includes, in response to verification of the renewed interface-specific token by the server, receiving the access to the media content from the server.

Figure 9:
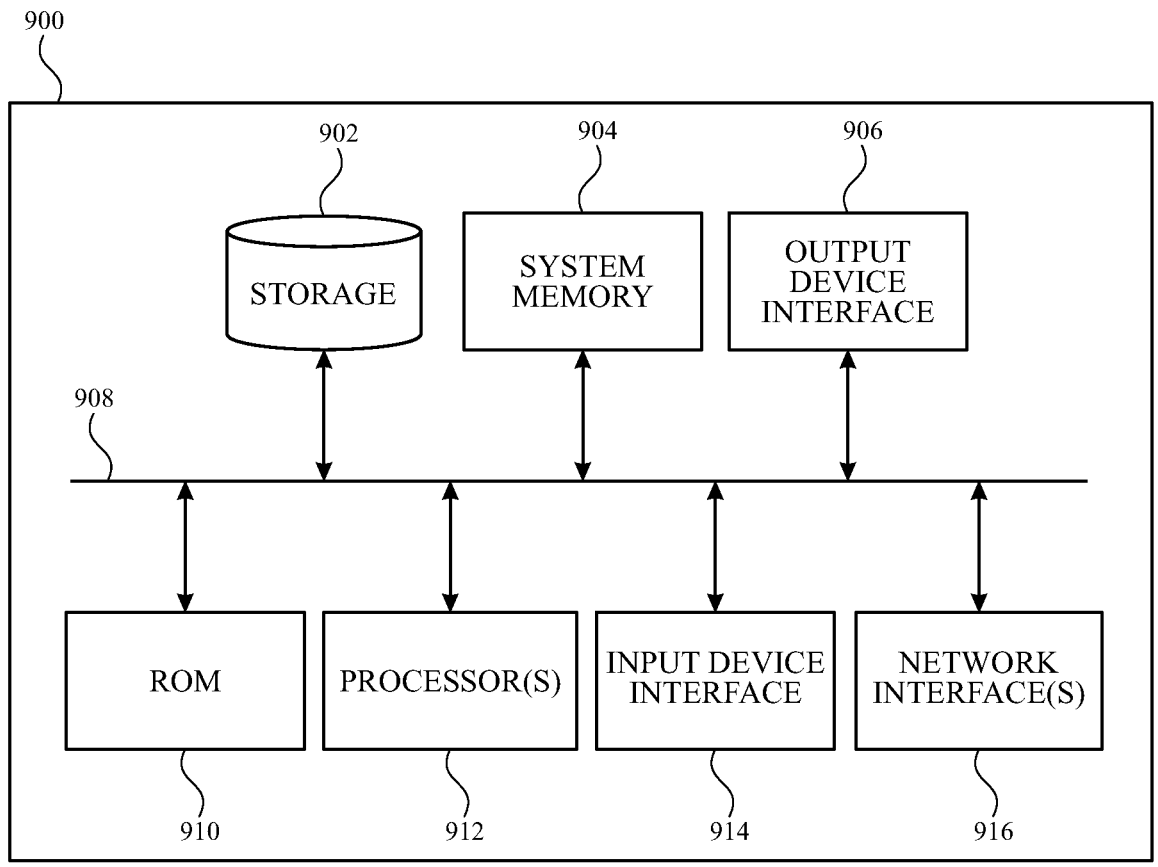
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic device 102, the content service 106, the media API service 112 of FIG. 1, or any other service and/or server that can implement processes in accordance with some implementations of the present disclosure. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more servers, such as the content service 106 (FIG. 1), through the one or more network interface(s) 916. In this manner, the electronic system 900 can be a part of a network of computers (such as a LAN, a wide area network ("WAN"), or an Intranet, or a network of networks, such as the Internet. As a person of skill in the art would appreciate, any or all components of the electronic system 900 can be used in conjunction with the subject disclosure, including components not shown in FIG. 9.

As described herein, aspects of the subject technology may include the collection and transfer of data from an application to other computing devices. The present disclosure contemplates that in some instances, this collected data may include personal information data that uniquely identifies or can be used to identify a specific person. Such personal information data can include demographic data, location-based data, media interaction data, online identifiers, telephone numbers, email addresses, voice data, audio data, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing access to media content via a reduced set of interfaces. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing access to media content via a reduced set of interfaces, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In accordance with aspects of the disclosure, a method is provided that includes providing, from a device to a server, a first request for media content, the first request including information indicating a user interface of the device, the user interface associated with the first request; obtaining, responsive to providing the first request, an interface-specific token associated with the media content from the server; providing the interface-specific token in a second request for the media content to the server; and in response to verification of the interface-specific token by the server, receiving the media content from the server.

In accordance with aspects of the disclosure, a non-transitory machine-readable medium is provided storing instructions that, when executed by one or more processors, cause the one or more processors to perform operations that include providing, from a device to a server, a first request for media content, the first request including information indicating a user interface of the device, the user interface associated with the first request; obtaining, responsive to providing the first request, an interface-specific token associated with the media content from the server; providing the interface-specific token in a second request for the media content to the server; and in response to verification of the interface-specific token by the server, receiving the media content from the server.

In accordance with aspects of the disclosure, an electronic device is provided that includes memory, and one or more processors, where the one or more processors are configured to provide, from a device to a server, a first request for media content, the first request including information indicating a user interface of the device, the user interface associated with the first request; obtain, responsive to providing the first request, an interface-specific token associated with the media content from the server; providing the interface-specific token in a second request for the media content to the server; and in response to verification of the interface-specific token by the server, receive the media content from the server.

In accordance with aspects of the disclosure, a method is provided that includes receiving a voice request for the media content from a user of the device at a voice user interface; and providing the first request to the server responsive to receiving the voice request, by providing the first request to the server via a virtual assistant server.

In accordance with aspects of the disclosure, a method is provided that includes receiving, at the device and after receiving the media content, a user request to play the media content; providing the interface-specific token and a third request for access to the media content to the server; and in response to verification of the interface-specific token by the server, receiving the access to the media content from the server.

In accordance with aspects of the disclosure, a method is provided that includes, providing a request from the device to the server to renew the interface-specific token; and in response to the server verifying the interface-specific token, receiving a renewed interface-specific token generated by server responsive to the request, wherein the renewed interface-specific token is associated with the media content.

In accordance with aspects of the disclosure, a method is provided that includes receiving, at the device, a user request to play the media content; providing the renewed interface-specific token and a third request for access to the media content to the server; and in response to verification of the renewed interface-specific token by the server, receiving the access to the media content from the server.

In some implementations, a method is provided that includes, without requesting a renewed interface-specific token associated with the media content from the server, and in response to the server verifying the interface-specific token, receiving a renewed interface-specific token associated with the media content.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   providing, from a device to a server, a first request for media content, the first request including information indicating a software user interface from a plurality of software user interfaces of the device, the software user interface associated with the first request;
   obtaining, responsive to providing the first request, an interface-specific token associated with the media content from the server and the software user interface of the device;
   providing the interface-specific token in a second request for the media content to the server; and
   in response to verification of the interface-specific token by the server, receiving the media content from the server.

2. The method of claim 1, wherein the interface-specific token is specific to the media content.

3. The method of claim 1, wherein the software user interface is a voice user interface of the device, the method comprising:
   receiving a voice request for the media content from a user of the device at the voice user interface; and
   providing the first request to the server responsive to receiving the voice request, by providing the first request to the server via a virtual assistant server.

4. The method of claim 1, wherein the software user interface is a recommended-content interface, and wherein providing the first request to the server comprises receiving a user input via recommended-content interface at the device.

5. The method of claim 1, wherein the first request includes authentication information for a user account, for determination, by the server, whether the device is associated with a subscription.

6. The method of claim 5, wherein the interface-specific token is obtained if it is determined by the server that the device is associated with the subscription and not associated with another subscription.

7. The method of claim 1, further comprising:
   receiving, at the device and after receiving the media content, a user request to play the media content;
   providing the interface-specific token and a third request for access to the media content to the server; and
   in response to verification of the interface-specific token by the server, receiving the access to the media content from the server.

8. The method of claim 1, wherein the interface-specific token comprises a prefix and a signature, and wherein the signature comprises a unique identifier associated with the media content and a unique identifier associated with a user of the device.

9. The method of claim 1, wherein the media content comprises a song.

10. The method of claim 1, wherein the media content comprises at least two pieces of the media content, and wherein obtaining the interface-specific token associated with the media content comprises obtaining a respective interface-specific token for each of a predetermined number of the at least two pieces of the media content.

11. The method of claim 1, further comprising:
providing a request from the device to the server to renew the interface-specific token; and
in response to the request and the server verifying the interface-specific token, receiving a renewed interface-specific token generated by the server responsive to the request, wherein the renewed interface-specific token is associated with the media content.

12. The method of claim 11, comprising:
receiving, at the device, a user request to play the media content;
providing the renewed interface-specific token and a third request for access to the media content to the server; and
in response to verification of the renewed interface-specific token by the server, receiving the access to the media content from the server.

13. The method of claim 1, further comprising:
without requesting a renewed interface-specific token associated with the media content from the server, in response to the server verifying the interface-specific token, receiving the renewed interface-specific token associated with the media content.

14. A non-transitory machine-readable medium storing instructions that, when executed by one or more processors, cause the one or more processors to perform operations comprising:
providing, from a device to a server, a first request for media content, the first request including information indicating a software user interface from a plurality of software user interfaces of the device, the software user interface associated with the first request;
obtaining, responsive to providing the first request, an interface-specific token associated with the media content from the server and the software user interface of the device;
providing the interface-specific token in a second request for the media content to the server; and
in response to verification of the interface-specific token by the server, receiving the media content from the server.

15. The non-transitory machine-readable medium of claim 14, wherein the interface-specific token is specific to the media content.

16. The non-transitory machine-readable medium of claim 14, wherein the software user interface is a recommended-content interface, and wherein providing the first request to the server comprises receiving a user input via recommended-content interface at the device.

17. The non-transitory machine-readable medium of claim 14, wherein the software user interface is a voice user interface of the device, and wherein the operations further comprise:
receiving a voice request for the media content from a user of the device at the voice user interface; and
providing the first request to the server responsive to receiving the voice request, by providing the first request to the server via a virtual assistant server.

18. An electronic device comprising:
a memory; and
one or more processors, the one or more processors being configured to:
provide, from to a server, a first request for media content, the first request including information indicating a software user interface from a plurality of software user interfaces of the electronic device, the software user interface associated with the first request;
obtain, responsive to providing the first request, an interface-specific token associated with the media content from the server and the software user interface of the electronic device;
provide the interface-specific token in a second request for the media content to the server; and
in response to verification of the interface-specific token by the server, receive the media content from the server.

19. The electronic device of claim 18, wherein the software user interface is a recommended-content interface, and wherein providing the first request to the server comprises receiving a user input via recommended-content interface at the electronic device.

20. The electronic device of claim 18, wherein the software user interface is a voice user interface of the electronic device, and wherein the one or more processors are further configured to:
receive a voice request for the media content from a user of the electronic device at the voice user interface;
generate the first request from the voice request; and
provide the first request to the server responsive to receiving the voice request, by providing the first request to the server via a virtual assistant server.

* * * * *